(12) United States Patent
Syed et al.

(10) Patent No.: US 8,024,492 B2
(45) Date of Patent: Sep. 20, 2011

(54) SYSTEM FOR MANAGING A POWER MONITORING SYSTEM CONTAINING A MULTIPLICITY OF INTELLIGENT ELECTRONIC DEVICES

(75) Inventors: Rafee Syed, Brentwood, TN (US);
Theresa Wall, Murfreesboro, TN (US);
Coni Wimsatt, Smyrna, TN (US);
Loretta Stokes, Murfreesboro, TN (US);
Jayme McQuillan, Murfreesboro, TN (US); Peter C. Cowan, Victoria (CA);
Jeffrey W. Johnson, Victoria (CA)

(73) Assignee: Schneider Electric USA, Inc., Palatine, IL (US)

( * ) Notice: Subject to any disclaimer, the term of this patent is extended or adjusted under 35 U.S.C. 154(b) by 146 days.

(21) Appl. No.: 12/342,182

(22) Filed: Dec. 23, 2008

(65) Prior Publication Data

US 2010/0161835 A1  Jun. 24, 2010

(51) Int. Cl.
*G06F 13/10* (2006.01)
(52) U.S. Cl. .............................................. 710/9; 710/15
(58) Field of Classification Search ........................ None
See application file for complete search history.

(56) References Cited

U.S. PATENT DOCUMENTS

| | | | | |
|---|---|---|---|---|
| 5,966,532 A * | 10/1999 | McDonald et al. | ........... | 717/105 |
| 6,639,518 B1 * | 10/2003 | Curtis | ........................... | 340/635 |
| 6,751,562 B1 * | 6/2004 | Blackett et al. | ................. | 702/61 |
| 6,798,190 B2 * | 9/2004 | Harding et al. | ................ | 324/142 |
| 6,853,978 B2 * | 2/2005 | Forth et al. | ....................... | 705/26 |
| 6,871,221 B1 * | 3/2005 | Styles | ........................... | 709/221 |
| 6,901,299 B1 * | 5/2005 | Whitehead et al. | ............. | 700/22 |
| 6,925,385 B2 * | 8/2005 | Ghosh et al. | ..................... | 702/14 |
| 6,944,555 B2 * | 9/2005 | Blackett et al. | ................. | 702/62 |
| 6,961,641 B1 * | 11/2005 | Forth et al. | ..................... | 700/295 |
| 6,988,025 B2 * | 1/2006 | Ransom et al. | ............... | 700/295 |
| 6,990,395 B2 * | 1/2006 | Ransom et al. | ............... | 700/295 |
| 7,127,328 B2 * | 10/2006 | Ransom | ......................... | 700/286 |
| 7,216,043 B2 * | 5/2007 | Ransom et al. | ................. | 702/62 |
| 7,246,014 B2 * | 7/2007 | Forth et al. | ..................... | 702/60 |
| 7,248,978 B2 * | 7/2007 | Ransom | ......................... | 702/62 |
| 7,272,458 B2 * | 9/2007 | Tomita | ............................ | 700/87 |
| 7,272,518 B2 * | 9/2007 | Bickel et al. | .................... | 702/61 |
| 7,281,218 B1 * | 10/2007 | Runge et al. | ................... | 715/769 |
| 7,415,368 B2 * | 8/2008 | Gilbert et al. | .................... | 702/61 |
| 7,421,352 B2 * | 9/2008 | Kennedy et al. | ................ | 702/61 |
| 7,447,760 B2 * | 11/2008 | Forth et al. | ..................... | 709/223 |
| 7,558,703 B2 * | 7/2009 | Stoupis et al. | ................ | 702/183 |
| 7,574,310 B2 * | 8/2009 | Kennedy et al. | ................ | 702/61 |
| 7,636,882 B2 * | 12/2009 | Aureglia et al. | .............. | 715/227 |
| 7,715,176 B2 * | 5/2010 | Perez et al. | .................... | 361/664 |
| 7,734,380 B2 * | 6/2010 | Ransom et al. | ............... | 700/286 |
| 7,747,718 B2 * | 6/2010 | Shirane et al. | ................ | 709/223 |
| 7,761,910 B2 * | 7/2010 | Ransom et al. | .................. | 726/6 |
| 2003/0074244 A1 * | 4/2003 | Braxton | ............................ | 705/7 |

(Continued)

FOREIGN PATENT DOCUMENTS

WO  WO 2007/032944  3/2007

*Primary Examiner* — Cheng-Yuan Tseng

(57) ABSTRACT

A method of managing a power monitoring and control informational system that encompasses multiple intelligent electronic devices (IEDs) of varying types comprises creating different device types, including tags associated with each of the device types; creating at least one profile for each of the device types; and generating a user interface display that enables a user to create a new profile, the display including options to create a new profile or to create a profile by modifying a copy of data representing an existing profile.

20 Claims, 17 Drawing Sheets

U.S. PATENT DOCUMENTS

| | | |
|---|---|---|
| 2005/0143941 A1* | 6/2005 | Forth et al. .................... 702/61 |
| 2006/0116794 A1* | 6/2006 | Stoupis et al. ................ 700/286 |
| 2006/0241793 A1* | 10/2006 | Skourup et al. ................ 700/83 |
| 2007/0014313 A1 | 1/2007 | Bickel et al. |
| 2007/0067737 A1* | 3/2007 | Zielinski et al. .............. 715/810 |
| 2007/0096942 A1* | 5/2007 | Kagan et al. ............. 340/870.02 |
| 2007/0118888 A1* | 5/2007 | Styles ................................ 726/5 |
| 2007/0199061 A1* | 8/2007 | Byres et al. ..................... 726/11 |
| 2007/0263643 A1* | 11/2007 | Wadhawan .................... 370/401 |
| 2008/0084266 A1 | 4/2008 | Fleege |
| 2009/0066528 A1* | 3/2009 | Bickel et al. .................. 340/657 |
| 2009/0164290 A1* | 6/2009 | Haschick et al. ................. 705/9 |
| 2009/0234471 A1* | 9/2009 | Chandhoke ..................... 700/86 |
| 2009/0240760 A1* | 9/2009 | McDougle ..................... 709/201 |
| 2010/0070255 A1* | 3/2010 | Biltz et al. ....................... 703/13 |

\* cited by examiner

SYSTEM FOR MANAGING A POWER MONITORING SYSTEM CONTAINING A MULTIPLICITY OF INTELLIGENT ELECTRONIC DEVICES

FIELD OF THE INVENTION

The present invention relates generally to electrical power monitoring systems and, more particularly, to management systems for power monitoring systems containing a multiplicity of intelligent electronic devices (IEDs).

BACKGROUND OF THE INVENTION

In a any software system (such as SCADA, HMI or DCS) that has to communicate with IEDs (devices), a tag (a description of how to read/write and format the data from a device) must be defined for every measurement that the software expects to read and write to an IED. This process is time-consuming and increases the time a systems integrator takes to install and commission a large software system. The more powerful a device's features/capabilities, the more tags/measurements that need to be defined and entered for use by the software.

The more sophisticated the capabilities of an IED (device), the more difficult it is to properly utilize the IED within a particular customer's system. Often how a device is used is very specific to the problems or issues that a customer is trying to solve, or around the market segment in which they are deployed. It is becoming increasingly difficult to find personnel that are experienced in a device's capabilities, and in the various market segments in which a particular device might be deployed. This lack of experienced personnel can result in poorly designed and implemented software solutions that do not truly meet the needs of the customer.

It is often difficult to do analysis on alarms and measurement data because the available information is insufficient. Often the creators of reports and/or analytical tools need to collect the required information after the fact, which requires extensive labor-intensive work.

SUMMARY OF THE INVENTION

According to one embodiment, a method of managing a power monitoring and control informational system that encompasses multiple intelligent electronic devices (IEDs) of varying types comprises creating different device types, including tags associated with each of the device types, creating at least one profile for each of the device types, and generating a user interface display that enables a user to create a new profile, the display including options to create a new profile or to create a profile by modifying a copy of data representing an existing profile.

This invention is capable of significantly reducing the setup time for a SCADA project, especially when the project includes a variety of different devices. Specifically, setup time is reduced by creating a library of profiles and then, after automatically detecting all the IEDs in a system and creating a communication hierarchy, automatically applying the appropriate profile based on the type of device found and/or the market segment encountered. Using spatial alignment algorithms, a power distribution hierarchy can be created without the user having to enter all the devices' communication information.

Thus, the system capitalizes on the existing knowledge of an experienced engineer or market expert. These experts can create profiles based on their knowledge of devices and/or market segments, and these profiles can then be reused by less experienced personnel. Once created, the profiles can be used to both communicate with devices and enhance the user's ability to do analysis and reporting without any additional expert knowledge.

The system also reduces user errors. The profiles can be tested before they are stored in the library, and then they can be reused without repeating the testing. Automatic detection of the correct communication routing eliminates user errors that can occur during manual entry of such data. Automatic application of profiles also eliminates such user errors.

BRIEF DESCRIPTION OF THE DRAWINGS

The invention may best be understood by reference to the following description taken in conjunction with the accompanying drawings, in which:

FIG. 2A is a functional block diagram of an intelligent electronic device coupled to the power monitoring and control information system shown in FIG. 1.

FIG. 8 is a screen shot of the user interface display generated when the "Add/Edit Custom Tags" button in FIG. 6 is clicked and the "Create New" option for creating a new custom tag is selected, in the IED management system of FIG. 2.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
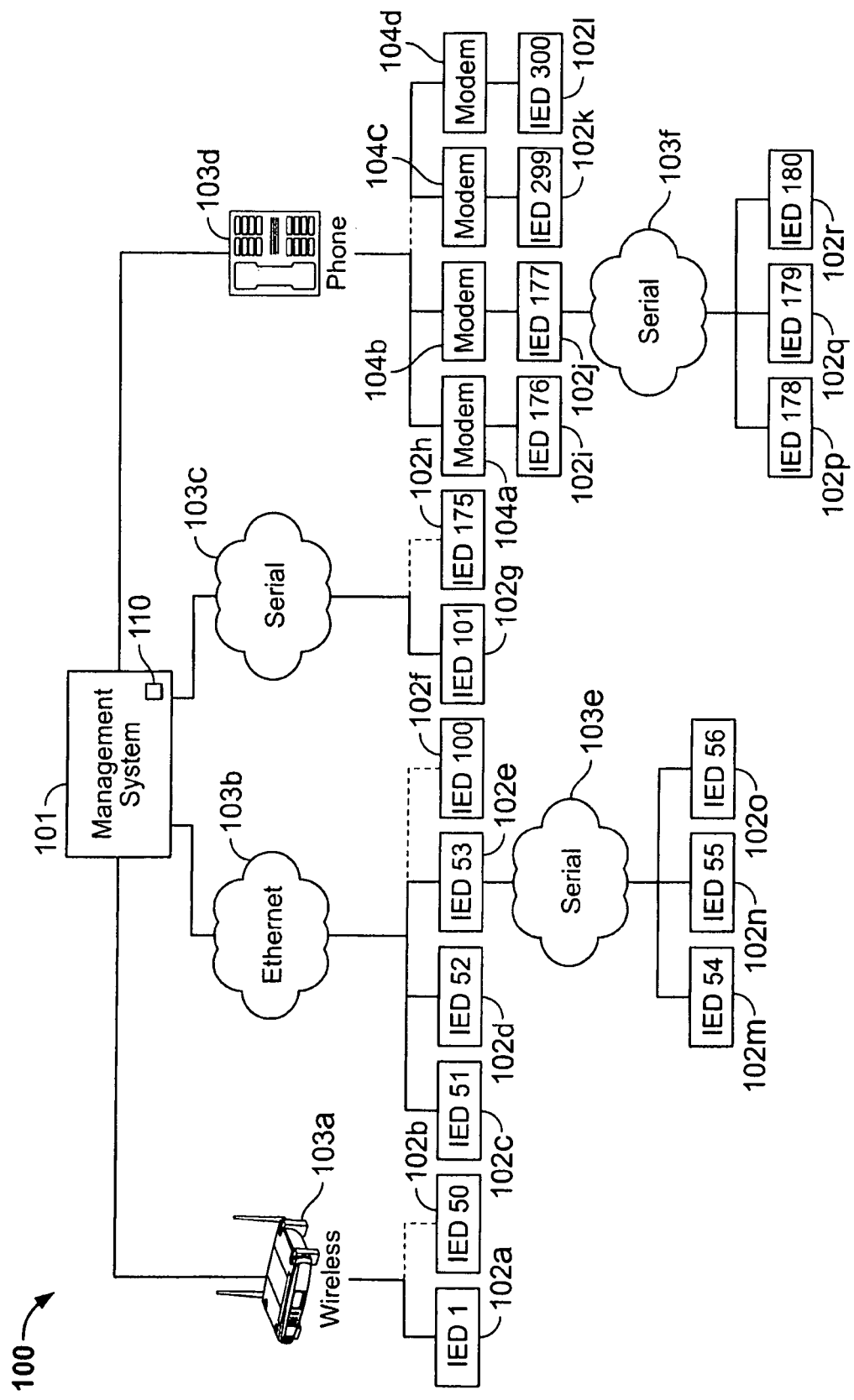
FIG. 1 is a functional block diagram of an exemplary power monitoring and control information system that includes an IED management system.

Turning now to FIG. 1, a power monitoring system 100 includes a management system 101 coupled to multiple intelligent electronic devices (hereafter "IEDs") 102a-102r through various wired and wireless networks 103a-103f. As used herein, an IED refers to any system element or apparatus with the ability to sample, collect or measure one or more operational characteristics or parameters of a power monitoring system 100.

Figure 2:
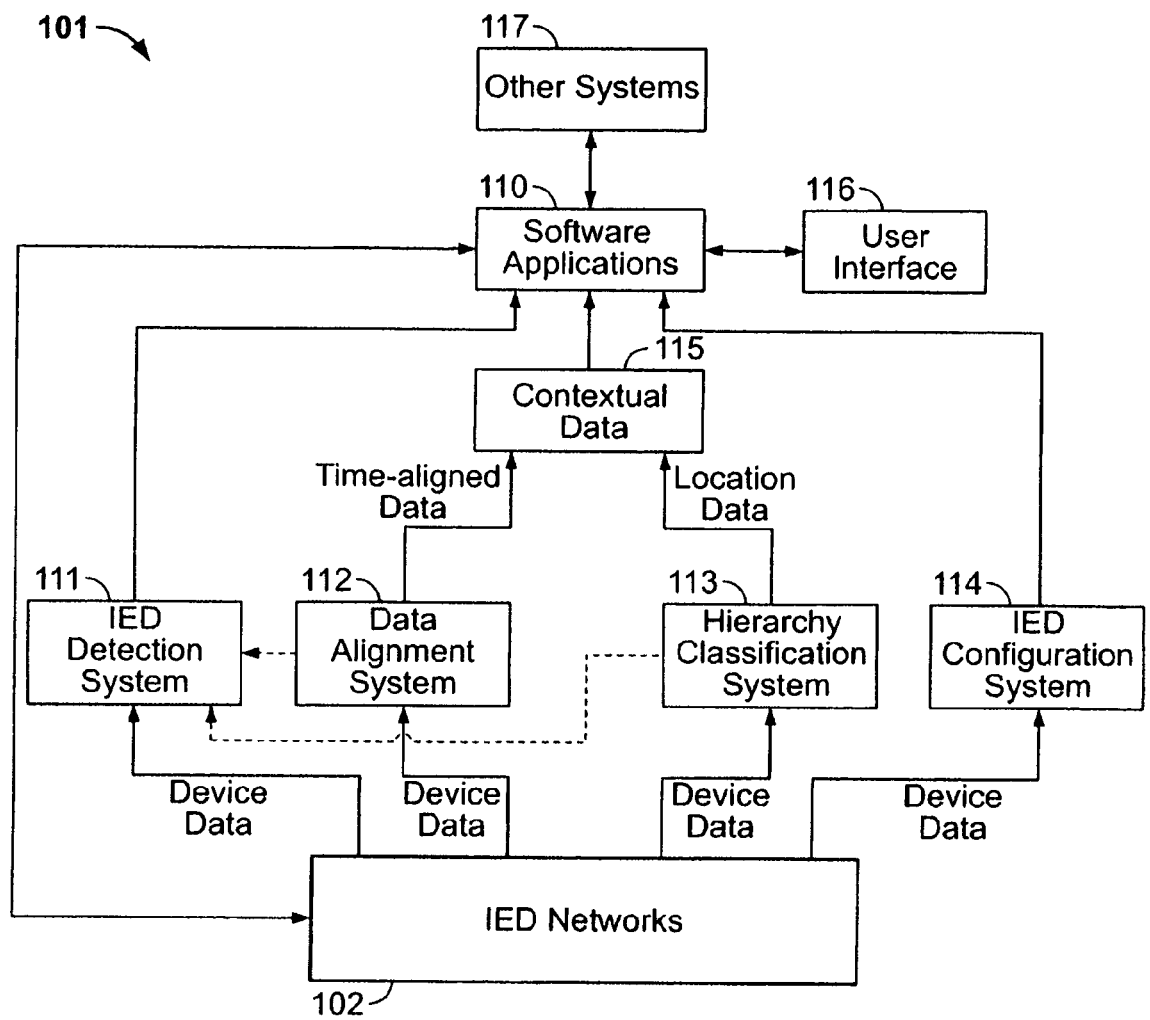
FIG. 2 is a functional block diagram of the IED management system in the power monitoring and control information system of FIG. 1.

As depicted in FIG. 2, the management system 101 includes software applications 110 that process data received from an IED detection system 111, a data alignment system 112, a hierarchy classification system 113 and an IED configuration system 114. The four systems 111-114 all receive data from the multiple IEDs 102

The data from all the IEDs 102 is aligned automatically in temporal or pseudo-temporal context in the automated data alignment system 112, which produces data that is temporally or synchronously aligned such that it represents the data when it was actually seen simultaneously by the IEDs in the power monitoring system 100. The hierarchy classification system 113 automatically learns the hierarchy of monitoring devices present in the power monitoring system 100 and their positional relationships relative to one another. Examples of the hierarchy classification system 113 and the auto-learned hierarchy algorithms associated therewith are described in commonly assigned U.S. Pat. No. 7,272,518, titled "Automated Hierarchy Classification in Utility Monitoring Systems," issued Sep. 18, 2007, and in commonly assigned PCT Patent Application No. PCT/US2006/034394, titled "Improvements in Hierarchy Determination for Power Monitoring Systems," filed Nov. 5, 2007. A hierarchy as used herein includes a series of ordered groupings of things within a system. These relationships may be physical (based on a power system one-line diagram for example) or functional (based on cost centers or other organizational divisions). In an electrical power system context, a hierarchy describes the organization of the electrical power system (whether utility-side or demand-side of the point-of-common coupling (PCC)). As used herein, an "auto-learned hierarchy algorithm" refers to any of the auto-learned hierarchy algorithms disclosed in U.S. Pat. No. 7,272,518.

Each IED 102 measures characteristics of the power monitoring system 100, and quantifies these characteristics into data that can be analyzed by a computer. For example, the monitoring device may measure power, energy, voltage, current, or other characteristics of electricity. In the electrical context, the IED may be based on a PowerLogic® Series 3000/4000 Circuit Monitor or a PowerLogic® ION7550/7650 Power and Energy Meter available from Schneider Electric or any other suitable IED device such as a microprocessor-based circuit breaker, relay, metering device, or power meter.

Generally, the hierarchy classification system 113 utilizes an auto-learned hierarchy algorithm in the monitoring system software that is based on rules and statistical methods. Periodically, the monitoring system software polls each monitoring device in the power monitoring system 100 to determine certain characteristics or parameters of the power monitoring system 100 at that node (represented by an IED). Multiple samples of specified parameters are taken from each IED in the system at the same given point in time (synchronous) or at substantially the same point in time (pseudo-synchronous). Once the parameter data is collected from each IED in the power monitoring system 100, the auto-learned hierarchy algorithm analyzes the data and traces the relationships or links among the monitoring devices with respect to the time the data sample was taken and the associated value of the data sample. This analysis may be performed periodically to increase the probability that the hierarchy is accurate, or to ascertain any changes in the hierarchy. Once this iterative process reaches some predetermined level of statistical confidence that the determined layout of the power monitoring system 100 is correct, the auto-learned hierarchy algorithm ends. The final layout of the power monitoring system 100 is presented to the user for concurrence. As each IED's data is evaluated over time (the learning period) with respect to all other IEDs using the auto-learned hierarchy algorithm, a basic layout of the hierarchical structure of the power monitoring system 100 is determined based on the monitoring points available. In this respect, the auto-learned hierarchy algorithm uses historical trends of the data from each IED, and those trends are compared to determine whether any interrelationship (link) exists between the IEDs. A more detailed hierarchical structure can be determined with more monitoring points available for analysis.

Samples of specific electrical characteristics (such as power, voltage, current, or the like) are simultaneously taken from each IED 102 in the power monitoring system 100. This data is stored and analyzed with respect to the time the sample is taken, the associated value of the data point, and the IED 102 providing the data. Data taken from each IED 102 is compared with each other to determine whether any correlation exists between the IEDs. The data is analyzed for statistical trends and correlations as well as similarities and differences over a predetermined period of time.

The data alignment system 112 aligns data, such as power, voltage, current, time, events, and the like, from the multiple IEDs 102 in the power monitoring system 100. When data from all the IEDs 102 is aligned to the same point (or approximately the same point based on pseudo-temporal alignment) in time that the data occurred, the data can be put into a temporal (synchronous) or pseudo-temporal (pseudo-synchronous) context from which additional decisions regarding hardware and software configuration can be automatically made or recommended. The measured data from various IEDs may be synchronized or pseudo-synchronized with each other within a temporal or pseudo-temporal context. Temporal alignment is more precise than pseudo-temporal alignment. As used herein, temporal is synonymous with synchronous. Pseudo-temporal alignment takes data within an acceptable range based on load changes in the system. Pseudo-temporal alignment systems typically utilize a global positioning system (GPS) or network time protocol (NTP) for clock synchronization. Automatic temporal alignment implementations are described in commonly assigned U.S. patent application Ser. No. 11/174,099, filed Jul. 1, 2005, titled "Automated Precision Alignment of Data in a Utility Monitoring System." In an automatic temporal alignment implementation, the data alignment system 112 synchronously aligns all IEDs 102 in an electrical system hierarchy to the zero-crossing of all three phase voltages without the use of additional hardware, notwithstanding potential phase shifts between various IEDs, such as for example, those caused by certain transformer configurations. When the data of the monitoring devices is aligned synchronously with each other, the system data is essentially aligned with respect to the time it occurred, making more complex data analyses feasible.

Figure 2A:
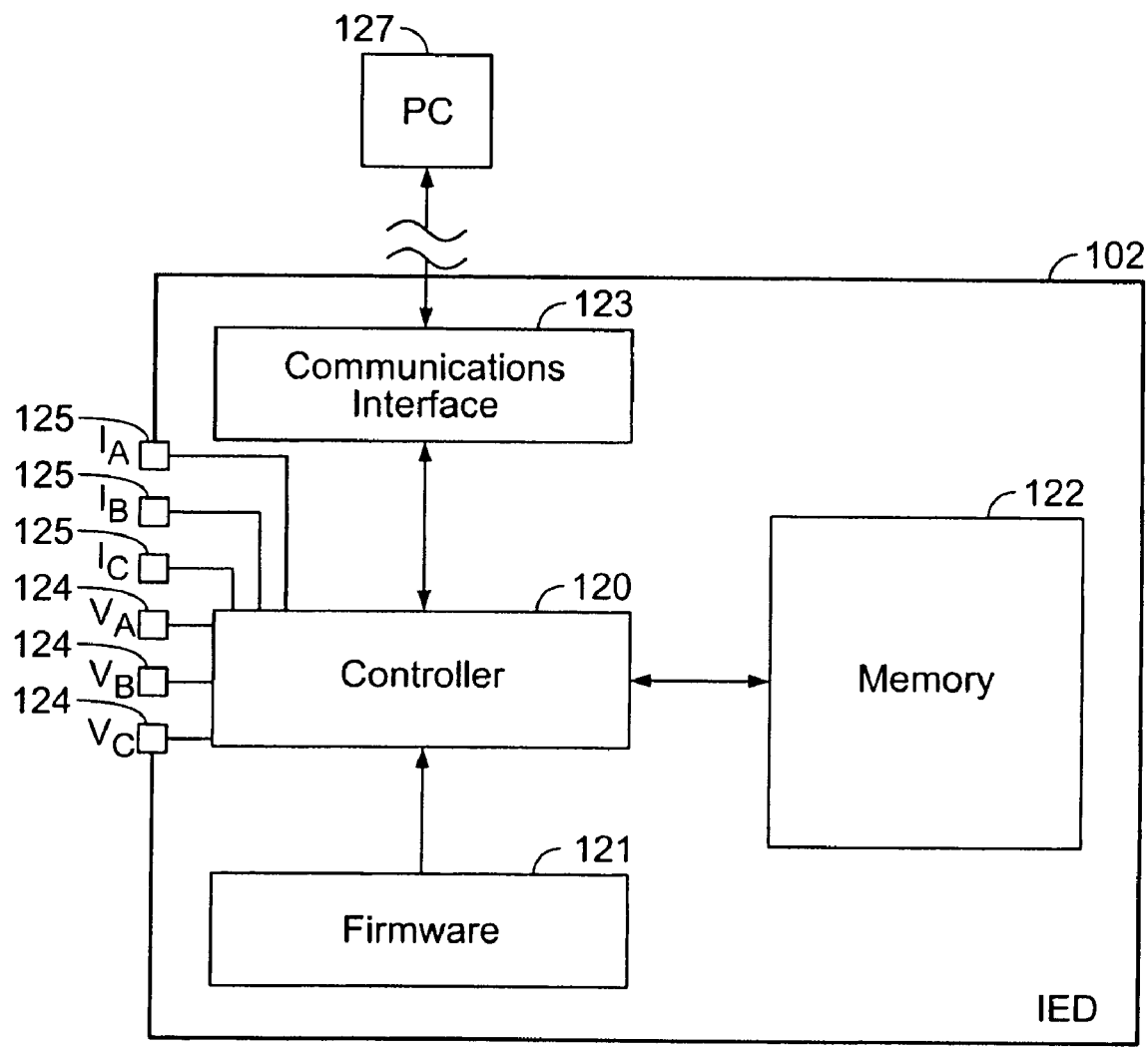
FIG. 2A is a functional block diagram of an intelligent electronic device coupled to the power factor evaluation system shown in FIG. 1.

An exemplary IED 102 is shown as a functional block diagram in FIG. 2A. The IED 102 includes a controller 120, firmware 121, memory 122, a communications interface 123, and three phase voltage conductor connectors 124a-124c, which connect to the $V_A$, $V_B$, and $V_C$ phase voltage conductors, respectively, and are coupled to the controller 120. Three phase current conductor connectors 125a-125c, which connect to the $I_A$, $I_B$, and $I_C$ phase current conductors, respectively, are optionally coupled to the controller 120. The firmware 121 includes machine instructions for directing the controller to carry out operations required for the IED 102. Memory 122 is used by the controller 120 to store electrical parameter data (power, energy, current, voltage, etc.) measured by the IED 102.

Instructions from a computer are received by the IED 102 via the communications interface 123. Those instructions may include instructions that direct the controller 120 to mark the cycle count, to begin storing electrical parameter data, or to transmit to the computer 127 electrical parameter data stored in the memory 122. The electrical parameter data can include any data acquired by IEDs, including any combination of power, energy, current, voltage, frequency variations, amplitude variations, and phase variations.

The IED detection system 111 automatically detects the IEDs 102 in the power monitoring system 100. For example, the IED detection system 111 automatically discovers configuration or identification information published by a local computer (publisher) connected to the IEDs 102 in the power monitoring system 100 and to a server that determines whether to approve data packets sent by the publisher. The publisher attempts to send a data packet including identification information to the server, which throws an exception with error code(s) indicating which information is missing in order for the server to approve the pending data transfer. The publisher interprets the error code(s) and sends back to the server the missing information, which may be identification information, configuration information, or both. This process of the server throwing an exception and the publisher attempting to send data packets or configuration information again may iterate more than once until the server approves the publisher, the device, and all topic information associated with the device and accepts the data for storage in the server database. Systems and methods that automatically detects IEDs are described in commonly assigned U.S. Published Application No. 2007-0263643 A1, titled "TRANSFER OF ELECTRICAL DATA WITH AUTO-DISCOVERY OF SYSTEM CONFIGURATION," dated Nov. 15, 2007.

Another example of how the IED detection system 111 automatically detects the IEDs 102 in the power monitoring system 100 is described in commonly assigned U.S. Published Application No. 2009-0287803 A1, titled "AUTOMATED DISCOVERY OF DEVICES IN LARGE UTILITY MONITORING SYSTEMS," filed May 13, 2008. The IED detection system 111 includes an auto-discovery algorithm that attempts a scattered-read of register addresses of an IED 102 in the power monitoring system 100 whose identity is unknown. If the scattered-read is successful, data from the IED 102 includes a device ID code that is matched against a lookup table of devices. If unsuccessful, the algorithm attempts a block-read, and if unsuccessful, iteratively checks each register against the lookup table to determine whether a match exists until either one is found or the IED 102 reports an illegal data address exception, whereupon the algorithm stops attempting to read from subsequent addresses. The algorithm analyzes the response from the communications driver of the computer system to determine whether the response is valid, and if not, what type of exception is reported. If a timeout occurs, the algorithm flags the IED 102 for a later retry scan, and moves on to attempt to discover the next IED 102.

The data integrated monitoring system 100 also includes an IED configuration system 114 that automatically configures the power monitoring system 100 based upon the locations of the IEDs 102 in a hierarchy representing the spatial interrelationships of the IEDs. The software applications 110 on a host computer may execute any or all of an alarm aggregation algorithm for aggregating multiple alarms based on device location; a feature distribution algorithm for enabling/disabling selected device features; an evaluation algorithm for evaluating device applications; a device check algorithm for detecting flawed data; a custom configuration algorithm for customized configuration of thresholds on device-by-device basis; a host computer configuration algorithm for configuring the host computer; a redundancy algorithm for verifying an electrical event; an alarm configuration algorithm for configuring device thresholds; and a configuration error checking algorithm for detecting nomenclature issues. These algorithms are described in more detail in commonly assigned U.S. application Ser. No. 11/900,262, titled "AUTOMATED CONFIGURATION OF A POWER MONITORING SYSTEM USING HIERARCHICAL CONTEXT," filed Sep. 11, 2007.

Creating or Editing Device Types

Figure 3:
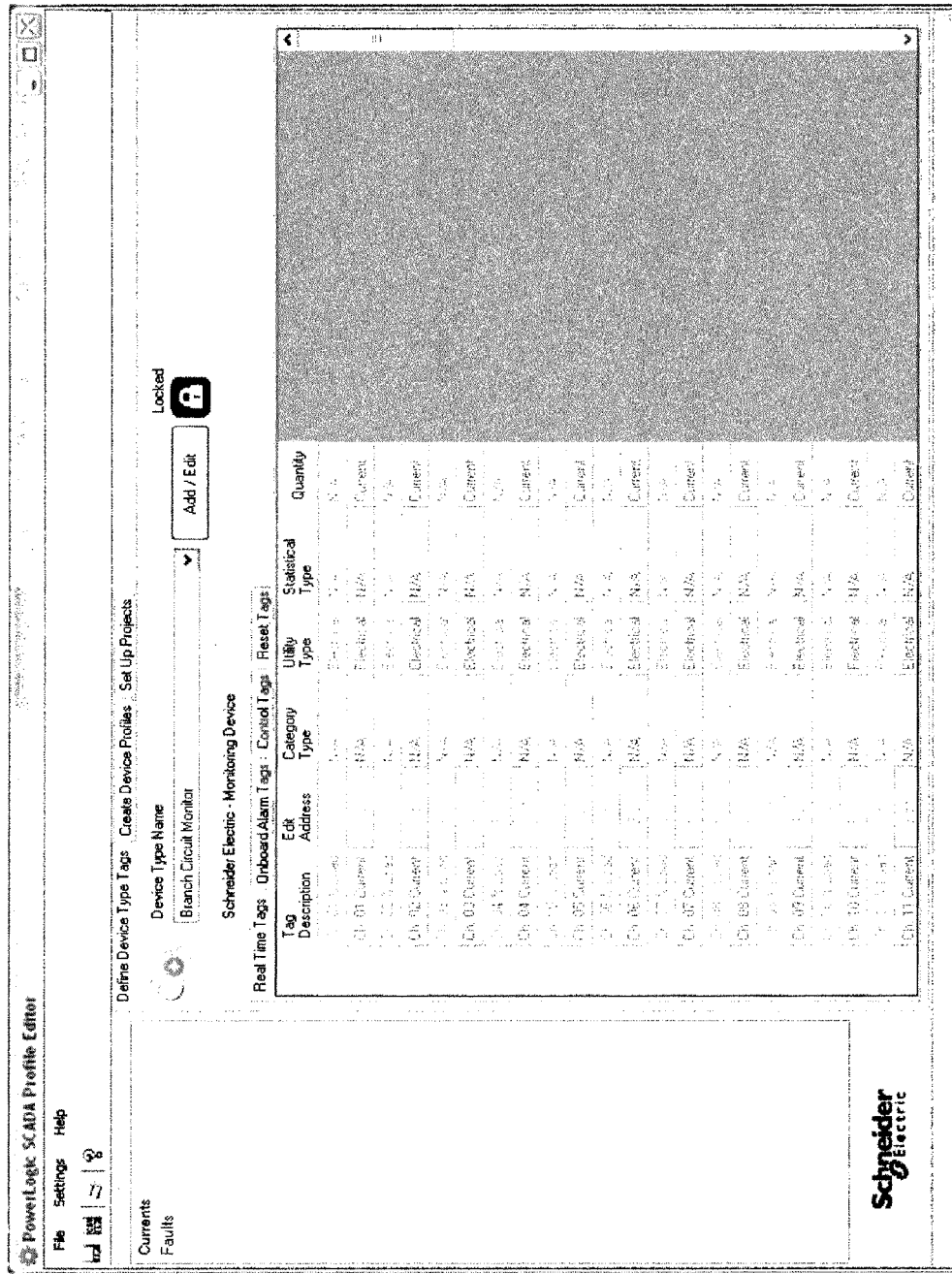
FIG. 3 is a screen shot of the user interface display generated when the "Define Device Type Tags" tab is clicked to begin the creation of a new device type, in the IED management system of FIG. 2.

When a new IED is to be commissioned, the user accesses the main page of the user interface 116, as shown in FIG. 3. There are three tab options the user can select: "Define Device Type Tags," "Create Device Profiles" and "Set Up Projects." A "tag" for an IED includes a name (such as "Current Phase A"), a unique identifier (such as MMXU1\A\phsA), and meta data (attributes used to categorize the data for intelligent display and/or analysis, such as Utility=Electrical, Statistical Type=RMS, Quantity=Current). A "SCADA tag" additionally includes an address (where to read raw data from a device) and a formatting scheme (what to do with the data after it is read to scale the data).

The default tab selected and displayed in FIG. 3 is "Define Device Type Tags," and the user has selected "Branch Circuit Monitor" from a pull-down menu in the box labeled "Device Type Name." If the system is currently unpopulated with any IEDs, the user has two options within this tab: (1) select a Device Type from the "Device Type Name" pull-down menu and then click on the "Add/Edit" button, or (2) click on the "Add/Edit" button without choosing a specific Device Type.

If the system has already been populated with IEDs and the user selects a Device Type Name that already exists in the system, the tags associated with the selected Device Type Name are listed under the tabs "Real Time Tags," "Onboard Alarm Tags," "Control Tags," and "Reset Tags." If the selected device type has been "Locked," as indicated by the "Locked" icon in FIG. 3, the list of tags is grayed out and cannot be edited. Thus, clicking on the "Add/Edit" button only allows a new device type based on an existing device type to be added to the system, without any editing done to the original device type. If the selected device type is not "Locked," the "Locked" icon in FIG. 3 is replaced with a "Custom" icon, which indicates that the user has the option of editing the Address of any existing tag associated with the selected Device Type. When a "Custom" device type has been selected, any associated tags will be automatically displayed under the "Real Time Tags" tab.

Figure 4:
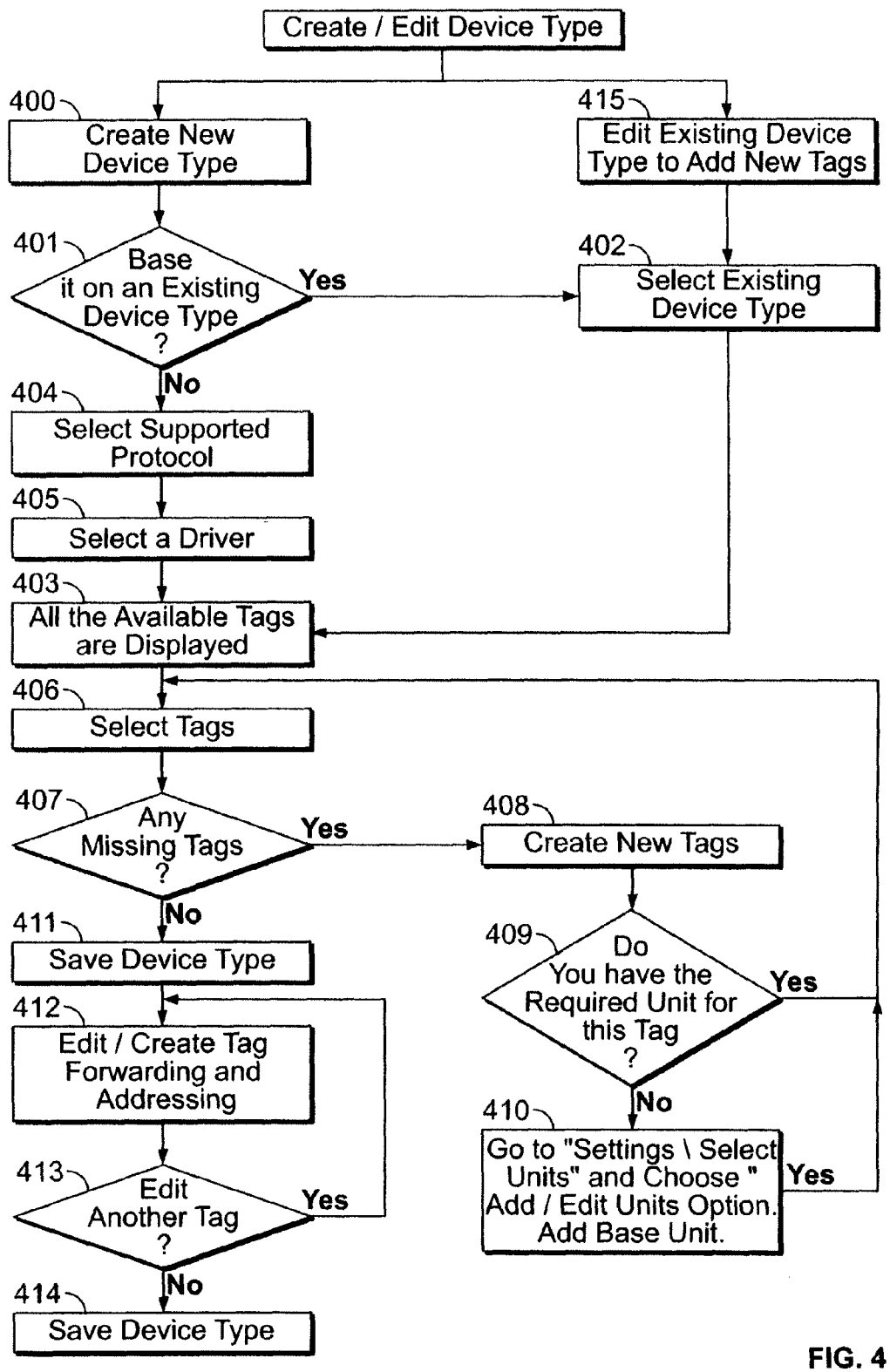
FIG. 4 is a flow chart of a routine used in the IED management system of FIG. 2 for creating or editing different types of IEDs used in the power monitoring system of FIG. 1.
Figure 6:
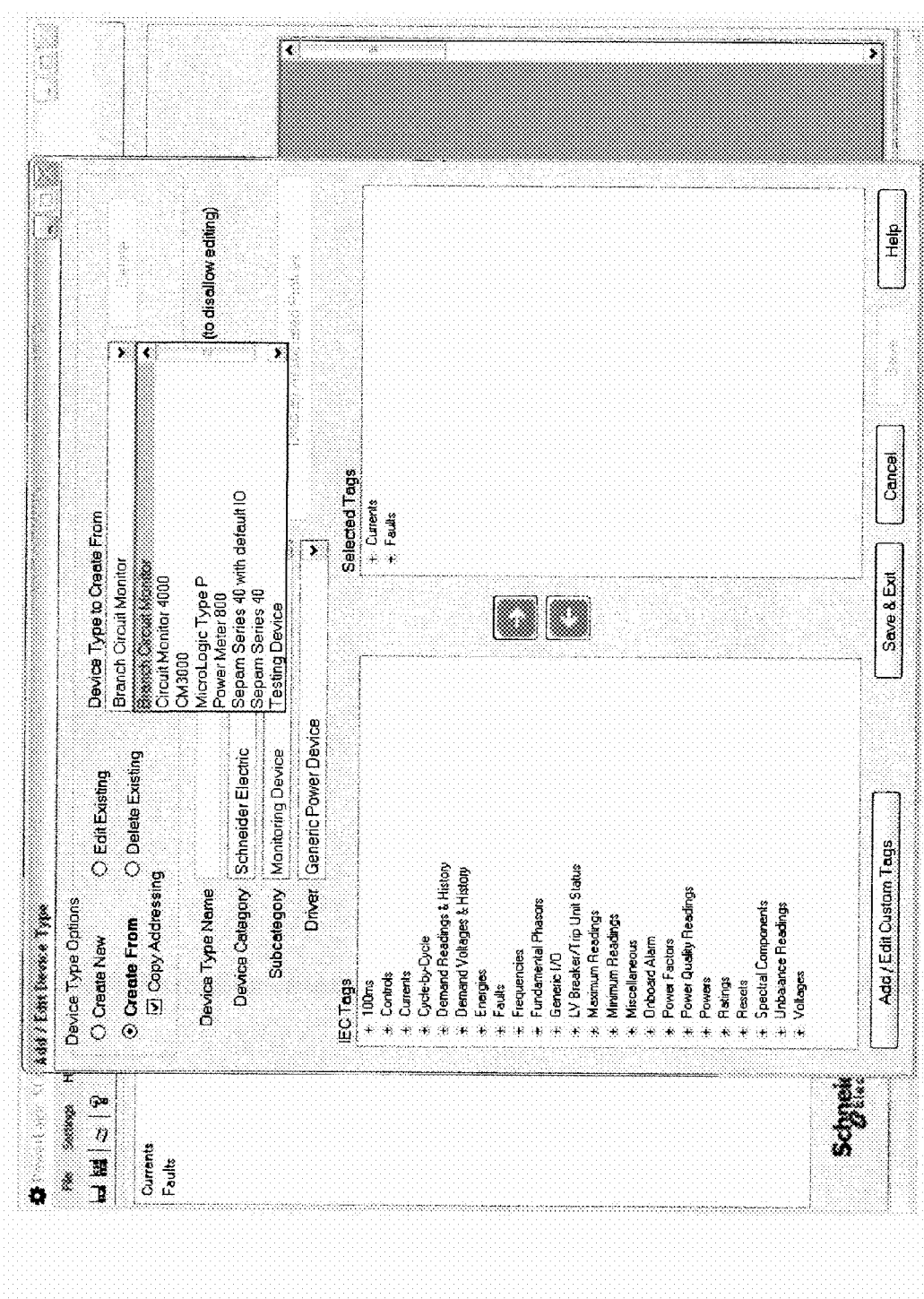
FIG. 6 is a screen shot of the user interface display generated when the "Add/Edit" button in FIG. 3 is clicked, the "Create From" option for creating a new device type is selected and the pull-down menu for "Device Type to Create From" is displayed, in the IED management system of FIG. 2.

Both options (1) and (2) from the main screen ultimately result in the user clicking on the "Add/Edit" button, which begins the execution of step 400 in a routine illustrated by the flow chart in FIG. 4, generating the display show in FIG. 6. This display includes a group of options that permit the user to advance to step 401 and choose whether the new device type is to be (1) a newly created device type (the "Create New" button in FIG. 6) or (2) created from an existing device type (the "Create From" button in FIG. 6). Additional options are to edit or delete an existing device type.

If the user chooses the "Create From" option, the routine proceeds to step 402 which generates a display containing a pull-down menu labeled "Device Type to Create From" that allows the user to select an existing device type from which to create the new device type, as seen in FIG. 6. When the user selects one of the listed device types, such as the "Branch Circuit Monitor" (selected in FIG. 6), the routine advances to step 403 and displays all the available IEC tags and any selected tags for the selected device type, as seen in FIG. 6. Step 406 allows the user to select all the appropriate tags for the selected device type from the two lists labeled "IEC Tags" and "Selected Tags." Tags can be added to or removed from the "Selected Tags" list by using the two green arrows between the two lists. After a tag is selected, the right arrow adds that tag to the "Selected Tags" list, and the left arrow removes it from the "Selected Tags" list back to the "IEC Tags" list.

Figure 7:
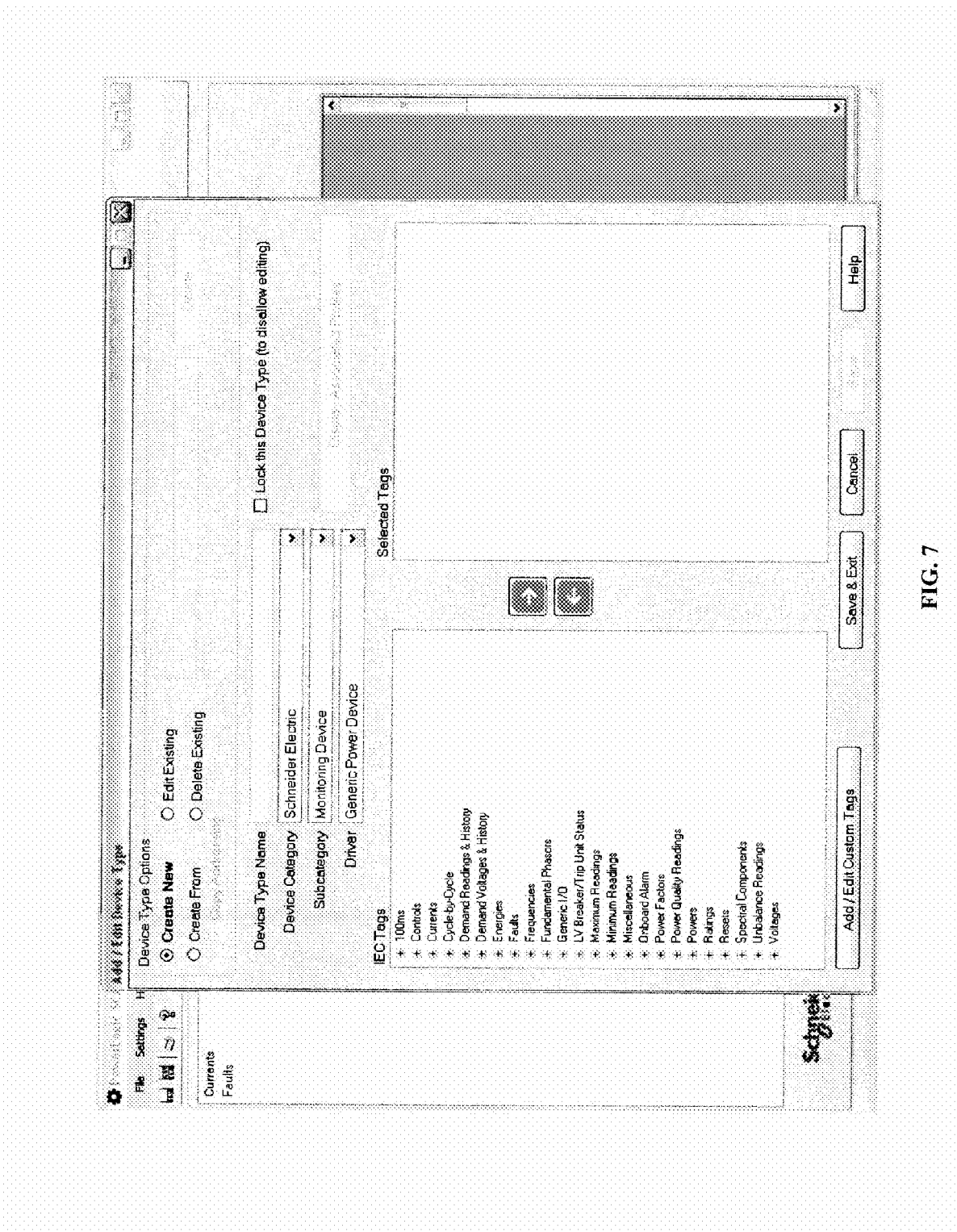
FIG. 7 is a screen shot of the user interface display generated when the "Add/Edit" button in FIG. 3 is clicked and the "Create New" option for creating a new device type is selected, in the IED management system of FIG. 2.

Returning to step 401 and FIG. 6, if the user selects the "Create New" device type option, the routine of FIG. 4 proceeds from step 401 to 404, generating the display shown in FIG. 7 that requires the user to input a "Device Type Name" and select a "Subcategory" and "Driver" for the new device type, completing step 405 of the routine. The device category is automatically identified by the system as "Schneider Electric". A check box next to the "Device Type Name" field labeled "Lock this Device Type" (see FIG. 7) allows the user to lock the device type so no other users can edit the device type after it has been saved. If this box is checked, the device type shows up as "Locked" from the main "Create Device Types" screen and all its tags are grayed out. The user must then follow the same steps as described for the "Create From" option, advancing to step 406 and adding tags for the device type.

Figure 8:
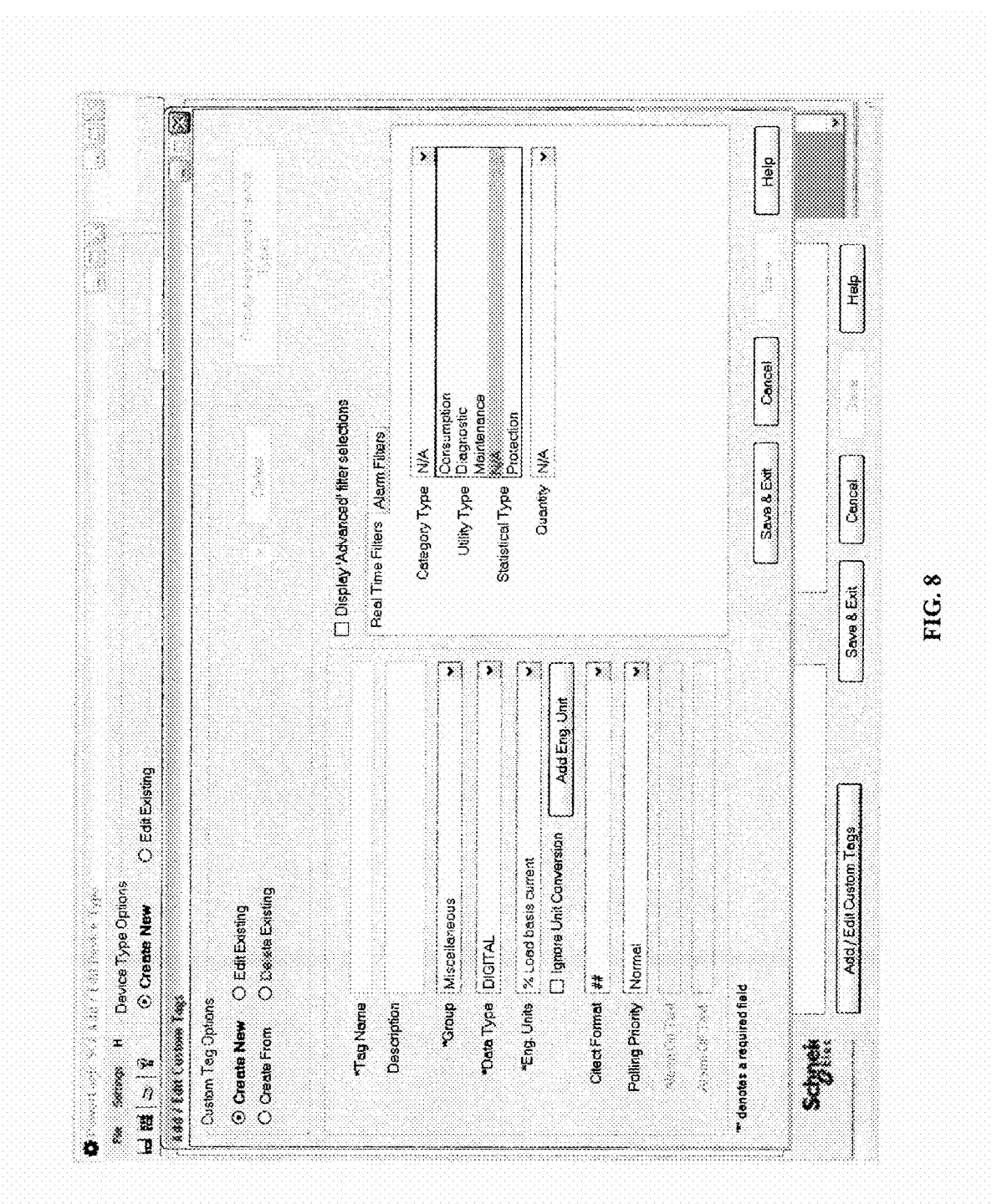

Step 407 requires the user to check if any tags necessary for the current device type are missing from the "IEC Tags" list. If any necessary tags are not already available in the "IEC Tags" list, the user clicks on the "Add/Edit Custom Tags" button at the bottom of the "Add/Edit Device Type" screen (FIG. 8), which advances the routine to step 408 to allow the creation of a new tag, e.g., by using the screen shown in FIG. 8. To add a new tag, the user can choose whether the new tag is to be (1) a newly created custom tag (the "Create New" button in FIG. 8) or (2) created from an existing custom tag (the "Create From" button in FIG. 8). Selecting the "Create New" option brings up the screen of FIG. 8, and the user must enter the required information to create a new tag, such as "Tag Name," "Description," "Group," "Data Type" and "Eng. Unit," which is the unit of engineering that will be used for the current tag. The user can also select "Real Time Filters" or "Alarm Filters" while adding or editing a custom tag, as shown in FIG. 8. Tags with Real Time Filters will be displayed on the main screen (FIG. 3) under the "Real Time Tags" tab, and tags with Alarm Filters will be displayed under the "Onboard Alarm Tags" tab. Real Time Tags are also known as variable tags and contain a real time measurement. Alarm tags contain a threshold value at which an alarm is to be triggered. Returning to FIG. 8 and step 408 of FIG. 4, if the user selects the "Create From" Custom Tag option, a screen similar to the screen of FIG. 8 is displayed. This screen includes a "Tag To Create From" pull down menu from which the user selects an existing tag as the base for creating the new tag.

Step 409 in the routine of FIG. 4 requires the user to confirm that the required Engineering Unit for the new tag is available. If the necessary Engineering Unit is unavailable, step 410 requires the user to add the necessary Engineering Unit appropriate for the tag by clicking on the "Add Eng. Unit" button beneath the "Eng. Units" pull-down menu. Clicking on this button takes the user to a screen where the necessary unit can be added. After adding a new Unit, the user clicks on "Save & Exit" to save the unit and return to the screen shown in FIG. 8. The newly added Unit is then displayed in the "Eng. Units" field. Upon completing all other tag information, selecting "Save & Exit" saves the tag and exits the screen. The user then sees a prompt asking "Would you like to select these tags?" and displaying the name of the newly created tag. Clicking "Yes" adds the new tag to both the "IEC Tags" list and the "Selected Tags" list, where the tag will immediately be displayed. Clicking "No" adds the tag only to the "IEC Tags" list, where the user can select the tag and add it to the "Selected Tags" list at a later time. Step 411 requires the user to save the newly created device type. To save, the user can click on either the "Save" or the "Save & Exit" button at the bottom of the "Add/Edit Device Type" screen (FIG. 7). "Save" allows users to save the device type and continue editing. The screen will remain the same, but the "Edit Existing" device type option will now be selected—a saved device type becomes an existing device type. "Save & Exit" saves the device type and exits the screen, returning the user to the screen in FIG. 3.

Figure 5:
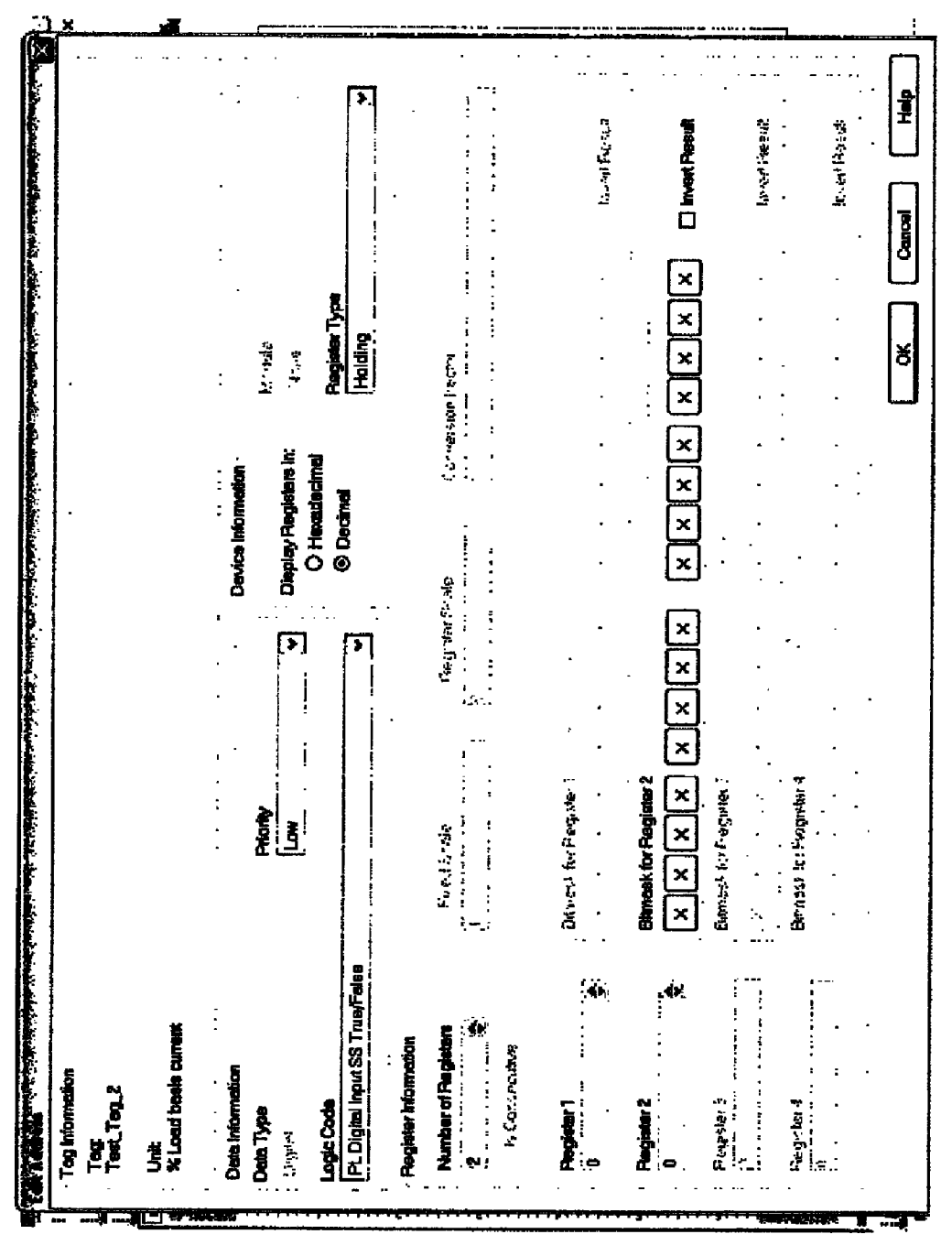

Step 412 of the routine in FIG. 4 allows users to edit the address of newly created tags from the main screen shown in FIG. 3. If a newly created device type has not been locked and is a "Custom" device type, any tags associated with it are displayed on the main screen shown in FIG. 3. However, instead of being grayed out as in FIG. 3, the tags for a "Custom" device type are available for selection. The grayed out "Edit" button under the heading "Edit Address" in FIG. 3 is available for the user to click on. Clicking on the "Edit" button directs the user to the "Edit Address" screen shown in FIG. 5, where the user can edit the address of that particular tag. Step 413 of the routine requires users to check if any more tags need to be edited. If the address of a tag is incomplete, the "Edit" button of that tag is red, notifying the user that information for that tag has yet to be completed. If the "Edit" buttons for all tags are black, there are no more tags left to edit and the user proceeds to step 414 to save the device type.

Returning to the beginning of the routine shown in FIG. 4, if the user chooses initially to edit an existing device type, rather than create a new device type, the routine begins with step 415, and then proceeds directly to step 402 et seq., as described above for creating a new device type from an existing device type.

Creating Device Profiles

Figure 10:
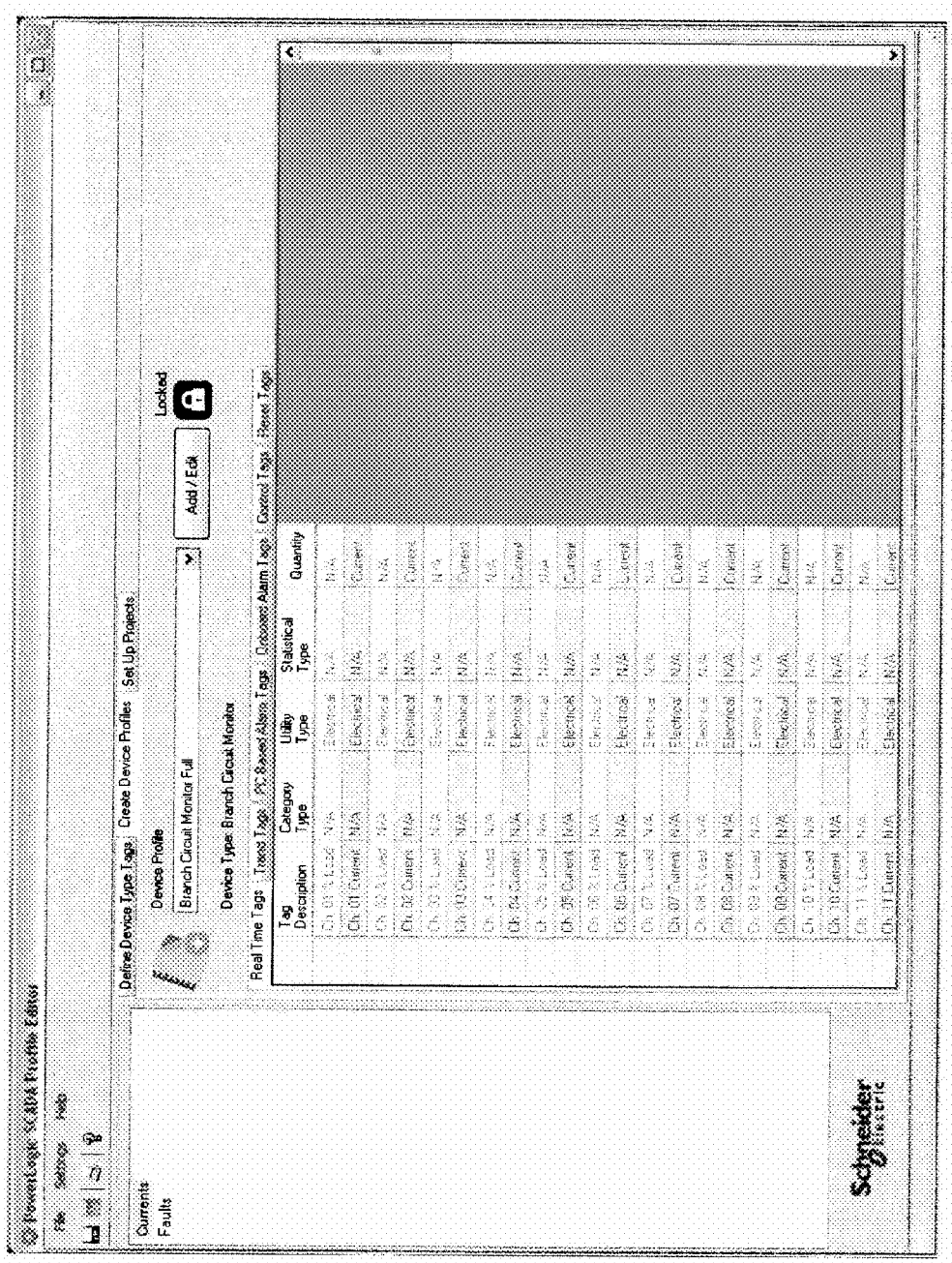
FIG. 10 is a screen shot of the user interface display generated when the second tab from FIG. 3, "Create Device Profiles," is clicked to begin the creation of a new device profile and a "Locked" Device Profile is selected, in the IED management system of FIG. 2.
Figure 11:
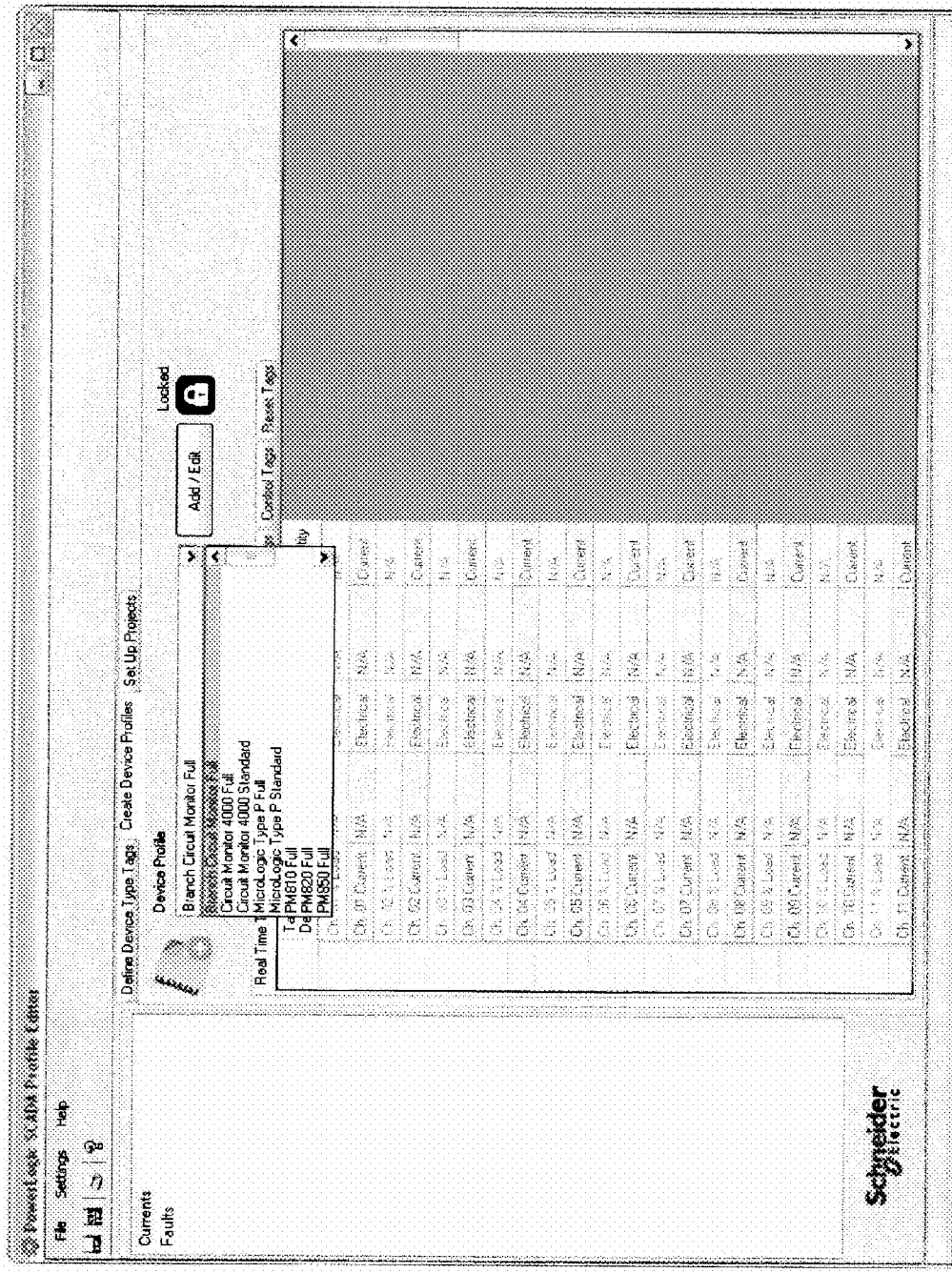
FIG. 11 is the same screen shot shown in FIG. 10 with the "Device Profile" pull down menu displayed, in the IED management system of FIG. 2.
Figure 12:
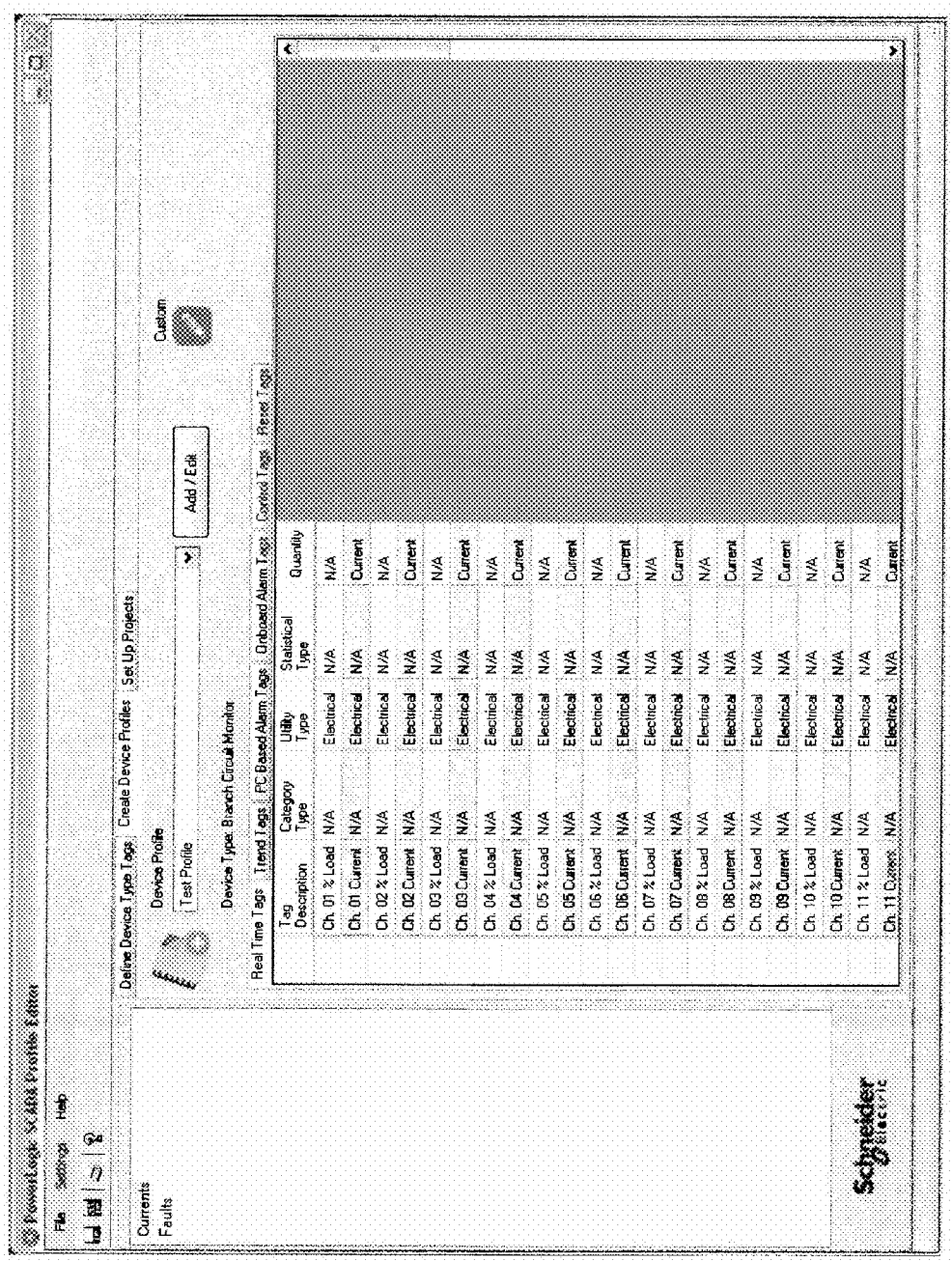
FIG. 12 is a screenshot of the user interface display generated when a "Custom" device profile from the pull down menu displayed in FIG. 11 is selected, in the IED management system of FIG. 2.

When a new device profile is to be created, the user clicks on the "Create Device Profiles" tab on the main page of the user interface, as shown in FIG. 10. Within this tab, the user has two options: (1) select a Device Profile from the "Device Profile" pull-down menu and then click on the "Add/Edit" button, or (2) click on the "Add/Edit" button without choosing a specific Device Profile. Selecting a device profile from the pull-down menu, displayed in FIG. 1, reveals whether that particular device profile is "Locked" or "Custom," indicated by an icon immediately to the right of the "Add/Edit" button. If a device profile is "Locked," any tags associated with that device profile, which are displayed in the window below the pull-down menu, are grayed out, as seen in FIG. 10, and cannot be edited. If a device profile is "Custom," any tags associated with that device profile are not grayed out and are available to edit, as seen in FIG. 12.

Figure 9:
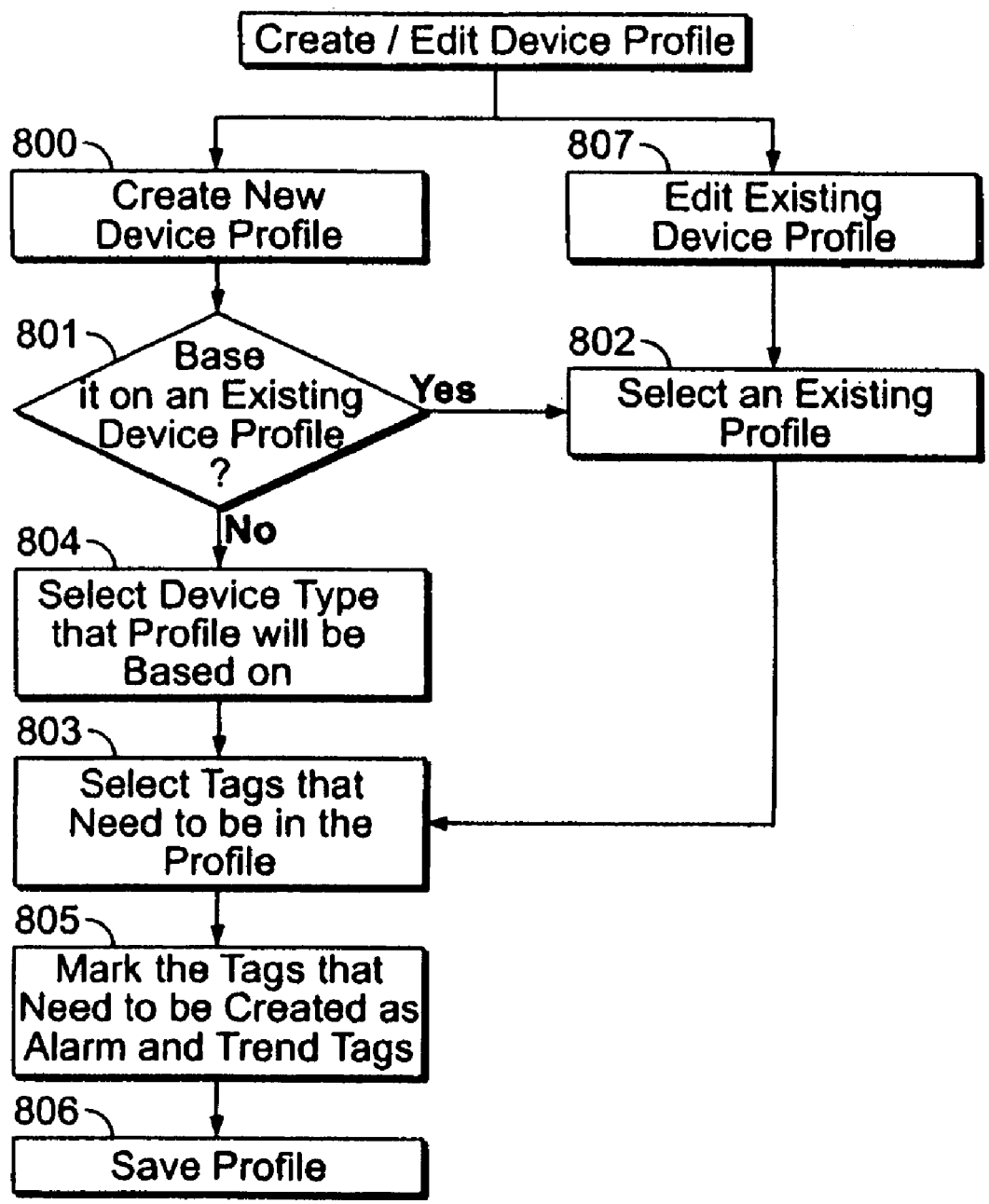
FIG. 9 is a flow chart of a routine used in the IED management system of FIG. 2 for creating or editing different device profiles of IEDs used in the power monitoring system of FIG. 1.
Figure 13:
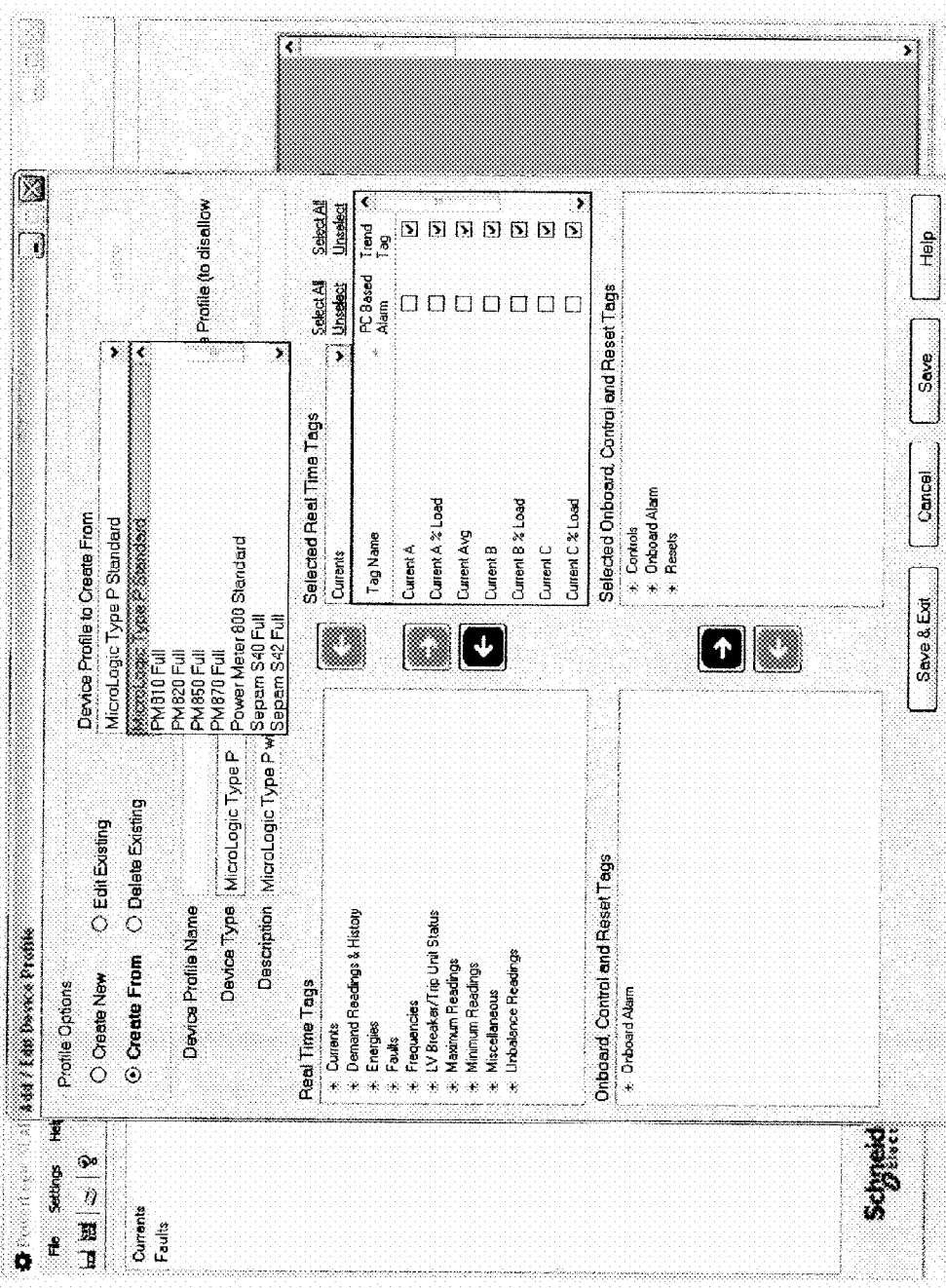
FIG. 13 is a screen shot of the user interface display generated when the "Add/Edit" button from FIG. 12 is clicked, the "Create From" option to begin the creation of a new device profile is selected and the "Device Profile to Create From" pull down menu is displayed, in the IED management system of FIG. 2.

Both options (1) and (2) ultimately result in the user clicking on the "Add/Edit" button, which begins the execution of step 800 in a routine illustrated by the flow chart in FIG. 9, which generates the "Add/Edit Device Profile" screen shown in FIG. 13. This screen includes a group of options that permit the user to advance to step 801 and choose whether the new device type is to be (1) a newly created device type or (2) created from an existing device profile Additional options are to edit or delete an existing device profile.

Figure 14:
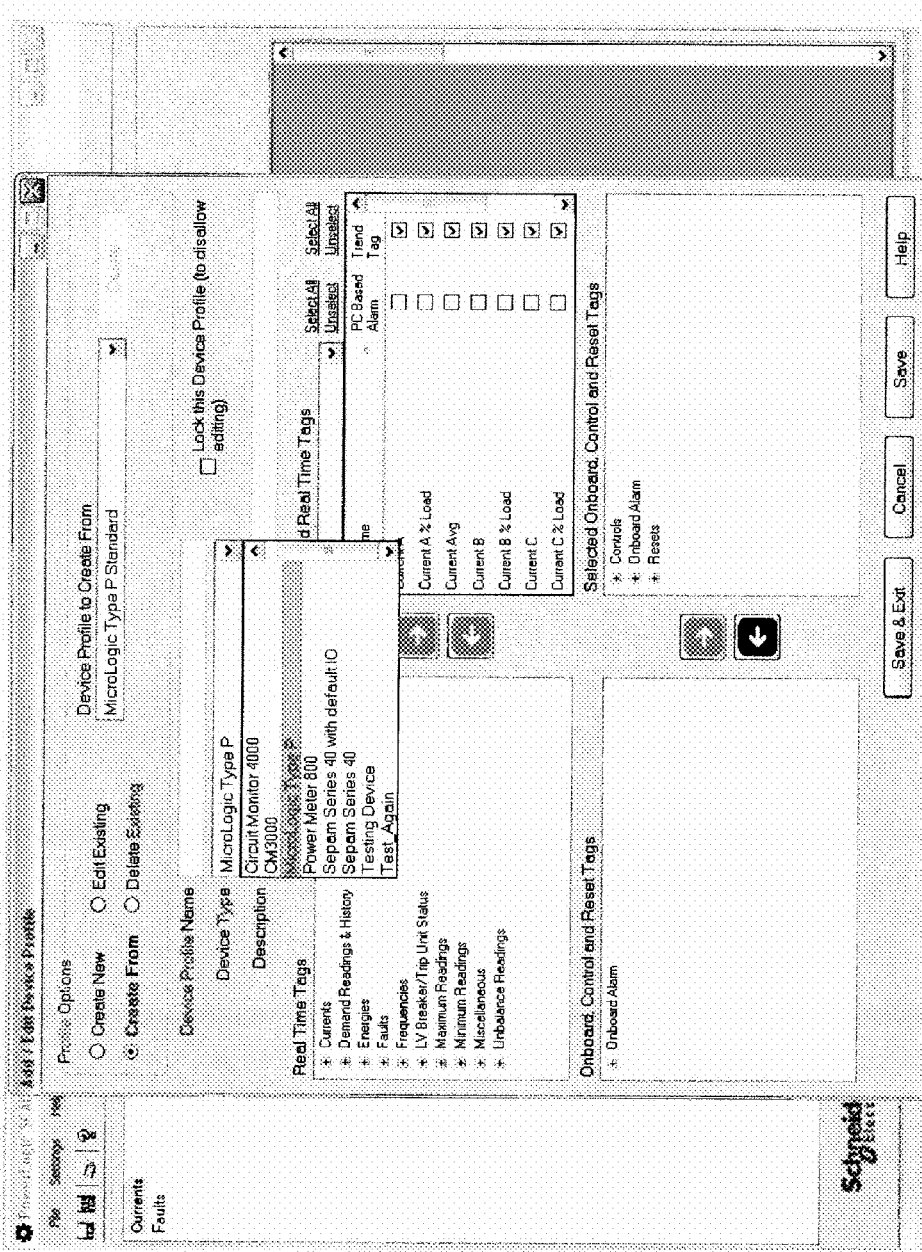
FIG. 14 is the same screen shot shown in FIG. 13, with the "Device Type" pull-down menu and the "Lock this Device Profile" checkbox displayed, in the IED management system of FIG. 2.

If the user chooses option (2) by selecting the "Create From" option, the routine of FIG. 9 advances to step 802, which requires the user to select an existing profile from the "Device Profile to Create From" pull-down menu, as seen in FIG. 13. Once an existing profile has been selected by the user, all "Real Time" tags and all "Onboard, Contol and Reset" tags associated with the selected device profile are displayed, as seen in FIG. 13. To create the new device, the user must enter a new name for the device profile in the "Device Profile Name" field and a new description in the "Description" field. A device type from the "Device Type" pull-down menu (FIG. 14) will automatically be selected depending on the device profile the user has selected. The user can choose to select the box to the right of the "Device Profile Name" field labeled "Lock this Device Profile" so other users cannot edit the profile once it has been saved If this box is checked, the device profile shows up as "Locked" from the main "Create Device Profiles" screen and all its tags are grayed out.

Figure 15:
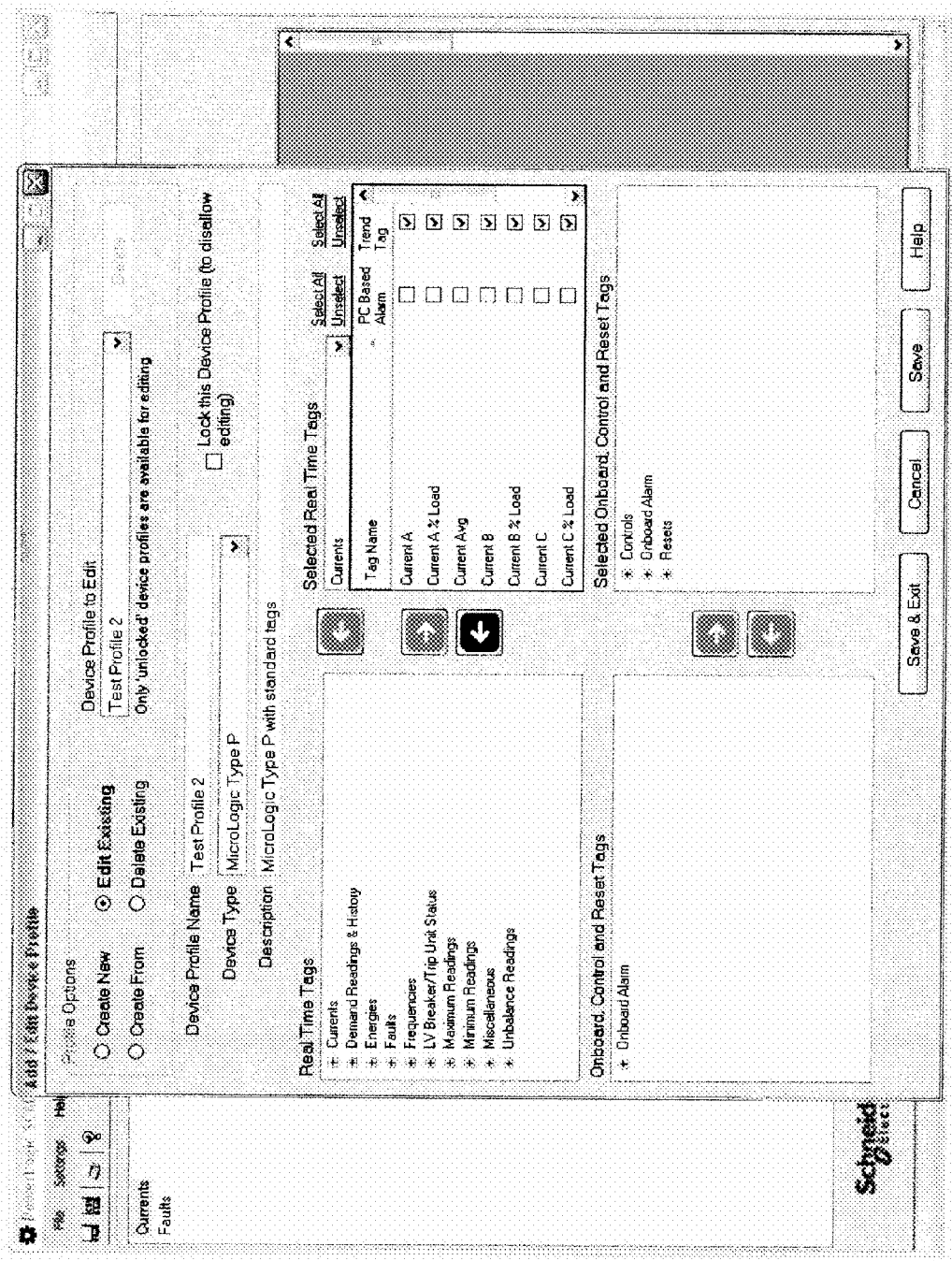
FIG. 15 is a screen shot of the user interface display generated when the "Edit Existing" option to edit a device profile is selected and an existing device profile from the "Device Profile to Edit" pull down menu is selected, in the IED management system of FIG. 2.

The user then proceeds to step 803 of the routine of FIG. 9, selecting the tags that need to be associated with the current profile. As can be seen in FIG. 15, there are two sections of tags. The first is for Real Time Tags, which contains two lists: "Real Time Tags" on the left side, and "Selected Real Time Tags" on the right side. The "Real Time Tags" list contains categories of Real Time tags, which can be further opened to reveal all the tags within that category. The "Selected Real Time Tags" list contains all tags that have been selected and moved over from the "Real Time Tags" list. The three green arrows are used to move tags between the two lists. The first arrow moves an entire category of tags from the "Selected Real Time Tags" list back to the "Real Time Tags" list, using the pull-down menu directly beneath the heading "Selected Real Time Tags." For example, in FIG. 15, the category of tags selected is "Currents." If the user clicks the first green arrow, all tags under the "Currents" category are moved from the "Selected Real Time Tags" list back to the "Real Time Tags" list. The other two green arrows transfer individual tags between the two lists. The tags in the "Selected Real Time Tags" list can be alphabetically sorted by clicking the small arrowhead on the right side of the "Tag Name" heading. The second section of tags is for Onboard, Control and Reset tags, which also contains two lists labeled "Onboard, Control and Reset Tags" on the left side and "Selected Onboard, Control and Reset Tags" on the right side. The user can transfer tags between these lists using the green arrows as described above.

Once the user has completed step 803 of the routine in FIG. 9 and selected all the appropriate tags for the current device profile, the user advances to step 805 of the routine and identify any tags that need to be marked as Alarm or Trend tags. The "Selected Real Time Tags" list contains two columns with checkboxes labeled "PC Based Alarm" and "Trend Tag." The user must check the appropriate box next to any tag he wishes to mark as an Alarm or Trend tag. The user can also use the "Select All" and "Unselect" options above the tag labels to simultaneously select or unselect all the tags in a column. Once a tag is checked, the corresponding information is created when the device is added to the database.

After checking all necessary tags, the user completes the routine of FIG. 9 by saving the device profile. The user has two options to save: (1) "Save" or (2) "Save & Exit." The user clicks on "Save" to save the profile while continuing to edit it. If the "Save" button is clicked, the profile is saved, but the user is not exited from the screen. However, the "Create From" option is no longer selected. Once a profile is saved, it becomes an existing profile; the screen remains the same, but the "Edit Existing" profile option is selected, as seen in FIG. 15. The "Save & Exit" button saves the profile and directs the user back to the main screen shown in FIG. 10.

Figure 16:
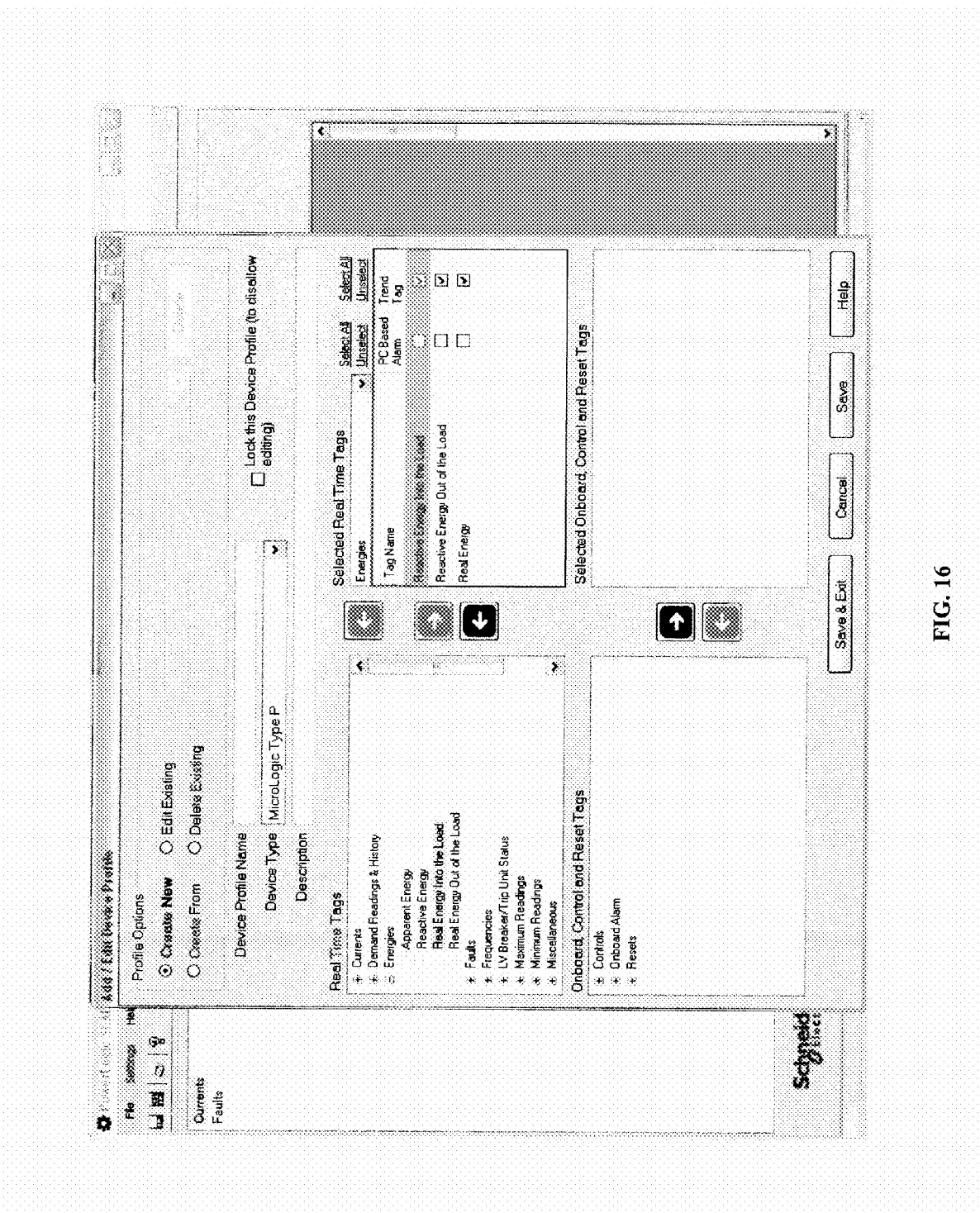
FIG. 16 is a screen shot of the user interface generated when the "Create New" option to create a new device profile is selected, the "Energies" category in the "Real Time Tags" list is opened and the "Selected Real Time Tags" for the "Energies" category are shown, in the IED management system of FIG. 2.

Returning to FIG. 13 and step 800 of the routine in FIG. 4, if the user initially selects the "Create New" device profile option, the routine advances to step 804. The user is directed to the screen displayed in FIG. 16. The user is now required to enter a "Device Profile Name" and "Description" for the new profile and select a Device Type on which the new profile is to be based. The user then advances to step 803 of the routine and must select any tags necessary for the current profile. Tag categories associated with the selected Device Type will automatically be displayed in the "Real Time Tags" list. The user adds tags from this list to the "Selected Real Time Tags" list. Once the necessary tags are added, the "PC Based Alarm" and "Trend Tag" checkboxes appear, as seen in FIG. 16. The user then proceeds to step 805 et seq., as described above for creating a new device profile from an existing device profile. From step 805, the routine advances to step 806 to save the new device profile.

Returning to the beginning of the routine shown in FIG. 9, if the user chooses initially to edit an existing device profile, rather than creating a new device profile, the routine begins with step 807, and then proceeds directly to step 802 et seq., as described above for creating a new device profile from an existing device profile.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of managing a power monitoring and control informational system, said method comprising
creating different device types, including tags associated with each of said device types, each of the device types including a name of a device type and a driver for the device type;
creating at least one device profile for each of said device types, the device profile including at least one tag;
automatically detecting, by a detection system in the power monitoring and control informational system, a plurality of intelligent electronic devices in the power monitoring and control informational system, each of the intelligent electronic devices being configured to measure characteristics of electricity and to quantify the measured characteristics as corresponding characteristic data, the intelligent electronic devices being of varying types, the at least one tag including a name of a first of the measured characteristics, a unique identifier distinct from all other tags, and metadata having attributes used to categorize data corresponding to the first measured characteristic;
providing an option to a user to create a user-defined device profile for a first of the detected intelligent electronic devices, the option including options to create a new device profile or to create a modified device profile by modifying a copy of data representing an existing device profile; and
automatically selecting one of the device types based on the user-defined device profile.

2. The method of claim 1 in which said device profile includes at least one real time tag and at least one tag selected from the group consisting of onboard, control and reset tags.

3. The method of claim 2 in which at least one of said tags is an alarm tag that includes a threshold value at which an alarm is to be triggered by the first intelligent electronic device.

4. The method of claim 2 in which said device profile includes at least one real time tag used as a trend tag, the real time tag including a variable tag having a real time measurement of the first measured characteristic measured by the first intelligent electronic device.

5. The method of claim 1 which includes
storing data representing multiple tags for use in creating new device profiles, and
wherein the option to create the new device profile is carried out by selecting tags from said stored data representing multiple tags.

6. The method of claim 5 in which said stored data representing multiple tags is grouped by device type.

7. The method of claim 6 in which said stored data representing multiple tags is grouped by real time parameters for each of said device types.

8. The method of claim 1 which includes providing a second option that enables a user to create a new device type, by modifying a copy of data representing an existing device type.

9. A management system for managing a power monitoring system, comprising:
a user interface that presents one or more pages for creating different device types, including tags associated with each of the device types, each of the device types including a name of a device type and a driver for the device type, and for creating at least one device profile for each of the device types, the device profile including at least one tag;
a hierarchy classification system including a controller and a memory, wherein the hierarchy classification system automatically learns a hierarchy of a plurality of intelligent electronic devices arranged in the power monitoring system, each of the intelligent electronic devices being configured to measure characteristics of electricity and to quantify the measured characteristics as corresponding characteristic data; and
a detection system that automatically detects the plurality of intelligent electronic devices;
wherein the at least one tag including a name of a first of the measured characteristics, a unique identifier distinct from all other tags, and metadata having attributes used to categorize data corresponding to the first measured characteristic,
wherein the one or more pages further include a second option to a user to create a user-defined device profile for a first of the intelligent electronic devices, the second option including options to create a new device profile or to create a modified device profile by modifying a copy of data representing an existing device profile, and
wherein the management system automatically selects one of the device types based on the user-defined device profile.

10. The management system of claim 9, wherein the device profile includes at least one real time tag and at least one other tag, the one other tag being an onboard tag, a control tag, or a reset tag.

11. The management system of claim 10, wherein at least one of the tags is an alarm tag that includes a threshold value at which an alarm is to be triggered by the first intelligent electronic device.

12. The management system of claim 10, wherein the device profile includes at least one real time tag used as a trend tag, the real time tag including a variable tag having a real time measurement of the first measured characteristic measured by the first intelligent electronic device.

13. The management system of claim 9, wherein the management system stores data representing multiple tags for use in creating new device profiles, the second option including an option to create a new device profile by selecting tags from the stored data representing multiple tags, the stored data being grouped by device type or by real time parameters for each of the device types.

14. The management system of claim 9, wherein the one or more pages further include a third option that enables the user to create a new device type, including by modifying a copy of data representing an existing device type that has already been created.

15. One or more non-transitory tangible media having software configured to be executed to implement a method of managing a power monitoring and control informational system, the method comprising:
providing an option to create different device types, including tags associated with each of said device types, each of the device types including a name of a device type and a driver for the device type;
providing an option to create at least one device profile for each of said device types, the device profile including at least one tag;
detecting a plurality of intelligent electronic devices in the power monitoring and control informational system, each of the intelligent electronic devices being configured to measure characteristics of electricity and to quantify the measured characteristics as corresponding characteristic data, the intelligent electronic devices being of varying types, the at least one tag including a name of a first of the measured characteristics, a unique identifier distinct from all other tags, and metadata having attributes used to categorize data corresponding to the first measured characteristic;

providing an option to a user to create a user-defined device profile for a first of the detected intelligent electronic devices, the option including options to create a new device profile or to create a modified device profile by modifying a copy of data representing an existing device profile; and selecting one of the device types based on the user-defined device profile.

16. The one or more non-transitory media of claim 15, wherein the device profile includes at least one real time tag and at least one other tag, the at least one other tag being an onboard tag, a control tag, or a reset tag.

17. The one or more non-transitory media of claim 15, wherein the real time tag includes a variable tag having a real time measurement of the first measured characteristic measured by the first intelligent electronic device.

18. The one or more non-transitory media of claim 15, wherein the at least one tag is an alarm tag that includes a threshold value at which an alarm is to be triggered by the first intelligent electronic device.

19. The one or more non-transitory media of claim 15, wherein the method further includes:

storing data representing multiple tags for use in creating new device profiles, and wherein the option to create the new device profile is carried out by selecting tags from said stored data representing multiple tags.

20. The computer product one or more non-transitory media of claim 15, the method further including providing a second option that enables a user to create a new device type, including by modifying a copy of data representing an existing device type.

* * * * *